(12) United States Patent
Maekawa

(10) Patent No.: US 6,229,559 B1
(45) Date of Patent: May 8, 2001

(54) IMAGE FORMING APPARATUS AND METHOD

(75) Inventor: Takeshi Maekawa, Niigata (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/325,142

(22) Filed: Jun. 3, 1999

(30) Foreign Application Priority Data

Jun. 4, 1998 (JP) .................................................. 10-170523

(51) Int. Cl.$^7$ ...................................................... B41J 2/47
(52) U.S. Cl. ............................................. 347/234; 347/248
(58) Field of Search .................................... 347/234, 235, 347/247, 248, 250, 116

(56) References Cited

U.S. PATENT DOCUMENTS 5,737,003 * 4/1998 Moe et al. ............................ 347/116
5,760,816 * 6/1998 Morrison ............................... 347/247
5,978,003 * 11/1999 Brenner, Jr. .......................... 347/234

FOREIGN PATENT DOCUMENTS 4-9975   1/1992 (JP) .
4-181276 6/1992 (JP) .
5-119574 5/1993 (JP) .

* cited by examiner

*Primary Examiner*—N. Le
*Assistant Examiner*—Hai C. Pham
(74) *Attorney, Agent, or Firm*—Ostrolenk, Faber, Gerb & Soffen, LLP

(57) ABSTRACT

An image registration method and apparatus for an electrophotographic color imaging system in which a scanning laser beam is used to create a latent image on a photo receptor belt. The belt, which moves continually in a direction transverse to the beam scanning direction, is also subject to unwanted movement in the scan direction which may degrade the latent image. For each scan cycle, the time the scanned laser beam encounters a selected edge of the belt is recorded, and is used to create a synchronized clock signal for controlling the modulation of the laser beam by the image data. A scan control synchronizing signal is also generated at a predetermined time after the edge of the photo receptor belt is encountered by the beam, to activate modulation by the image data. This assures that each write cycle begins at the same location relative to the edge of the belt, without the need to reposition the belt.

12 Claims, 4 Drawing Sheets

IMAGE FORMING APPARATUS AND METHOD

BACKGROUND OF THE INVENTION

1. Field of the Invention

The present invention relates to an apparatus and method for forming a latent image on a photo receptor belt.

2. Description of the Related Art

There have been developed devices for forming a color image using a photo receptor belt on which a latent image will be formed for each color. In such a color image forming device, there is a possibility of the photo receptor belt moving like a snake, resulting in displacements of the photo receptor belt in the primary scanning direction. Since such movements of the photo receptor belt cause displacements of a latent image for each color, it is very important to precisely keep the writing start positions for colors at the same position in the primary scanning direction on the photo receptor belt. To prevent color deviation, several image forming apparatuses have been proposed as described hereafter.

A conventional image forming apparatus is disclosed in Japanese Patent Unexamined Publication No. 4-181276. A photo-sensor is used to detect displacements of the photo receptor belt in the primary scanning direction. The photo-sensor is composed of a number of sensor elements arranged in a line and is placed in the inner side at an edge portion of the photo receptor belt such that the end portion of the photo-sensor protrudes from the edge line of the photo receptor belt. Therefore, the photo-sensor can detect the laser beam traversing only a range from the end thereof to the edge of the photo-receptor belt. The distance from the end thereof to the edge of the photo receptor belt is measured by counting the number of sensor elements therebetween. On a first turn of the photo receptor belt, a measured count value is stored. When the photo receptor belt is turned for a second time, a count difference between the first measured count value and the second measured count value is calculated. The count difference is used to determine the write start position on the photo receptor belt.

Another conventional image forming apparatus is disclosed in Japanese Patent Unexamined Publication No. 5-119574. A plurality of primary scanning laser units are provided to form latent images on the photo receptor belt, respectively. A photo-sensor for each primary scanning laser unit is placed to detect a pre-pattern formed on the edge portion of the photo receptor belt when the photo receptor belt is scanned with a laser beam by the primary scanning laser unit. The position detection signal of the photo-sensor is used to determine the write start timing.

However, in the case of the conventional apparatus using the count difference, a memory for storing the count difference is needed and further a controller is burdened with the distance measurement and displacement calculation.

On the other hand, in the case of the conventional apparatus using pre-pattern position detection signals, it is necessary to provide the photo receptor belt with the pre-patterns. Further, since the write start timing is determined using only the pre-pattern detection signal, the write start timing cannot be determined with sufficient precision.

SUMMARY OF THE INVENTION

Accordingly, it is an object of the present invention to provide an image forming apparatus and method, which can form an image on a photo receptor belt at a precise position with simplified circuit configuration.

It is another object of the present invention to provide an image forming apparatus and method, which prevent color deviation of an image formed on a photo receptor belt with reduced burden upon a controller.

According to the present invention, a latent image is formed on a photo receptor belt by scanning the photo receptor belt with a laser beam modulated in accordance with the image data. A clock signal controls the modulation process. After detecting an edge of the photo receptor belt to produce an edge detection signal, the clock signal is synchronized to the edge detection signal to produce a sync clock signal. The start time of modulating the laser beam according to the image data is determined based on the sync clock signal.

According to another aspect of the present invention, a first clock generator generates a clock signal and an edge detector detects an edge of the photo receptor belt to produce an edge detection signal. A second clock generator generates a sync clock signal by synchronizing the first clock signal to the edge detection signal. An image signal generator generates the image data beginning at a start time determined based on the sync clock signal.

Since the start time of the sync clock signal with respect to the edge of the photo receptor belt is kept constant, the write start position of the image data is at a constant distance from the edge of the photo receptor belt independently of displacements of the photo receptor belt.

Therefore, in the case of color image forming, color deviation of the image formed on the photo receptor belt can be eliminated, resulting in high-quality color image.

Further, since the sync clock signal is synchronized to the edge of the photo receptor belt, it is not necessary to use the reference signals of the laser units to determine the write start positions, respectively. The respective reference signals of the laser units would vary, resulting in variations in the write start positions. Therefore, by using the sync clock signal synchronized to the edge of the photo receptor belt, the precise write start position of the image data can be achieved.

DETAILED DESCRIPTION OF THE PREFERRED EMBODIMENT

Figure 1:
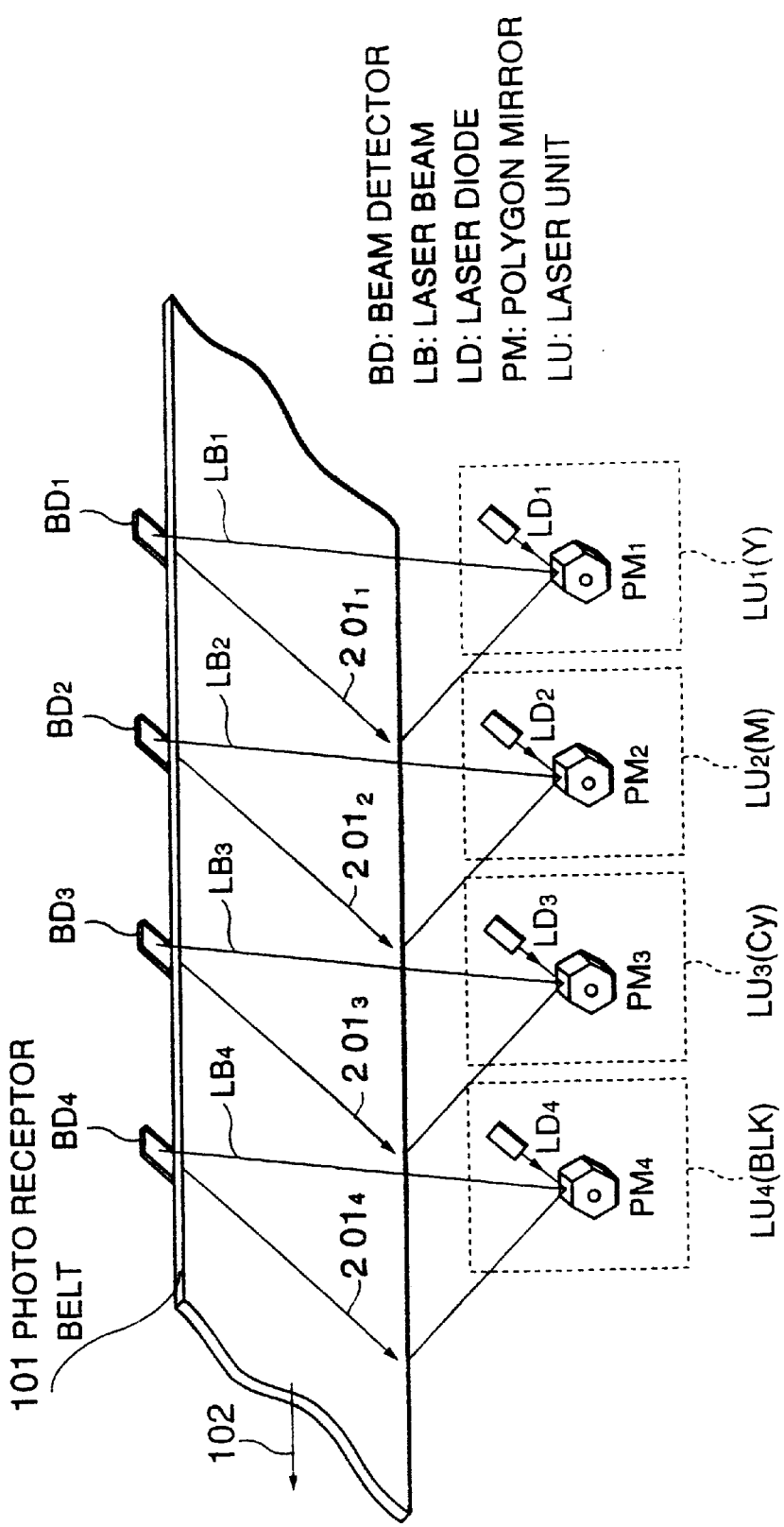
FIG. 1 is a schematic diagram showing an electrophotographic color printer employing a color image forming apparatus according to an embodiment of the present invention.

Referring to FIG. 1, an electrophotographic color printer is provided with a photo receptor belt 101 which is composed of a flexible base coated with photoconductive material by coating or evaporation. When a latent image is formed, the photo receptor belt 101 is turned in a direction of an arrow 102 by a driving mechanism (not shown).

A color image forming apparatus employed in the electrophotographic color printer is composed of laser units $LU_1$ to $LU_4$ for colors (here, Yellow, Magenta, Cyan, and Black) and beam detectors $BD_1$ to $BD_4$ corresponding to the laser units $LU_1$ to $LU_4$, respectively.

The beam detectors $BD_1$ to $BD_4$ are placed behind the photo receptor belt 101 across the edge thereof. The details will be described later.

The laser units $LU_1$–$LU_4$ basically have the same circuit structure. For example, the laser unit $LU_1$ includes a polygon mirror $PM_1$, an f-θ lens (not shown), and a laser diode $LD_1$. The polygon mirror $PM_1$ turns and the laser diode $LD_1$ emits a laser beam $LB_1$ to the polygon mirror $PM_1$ at which the laserbeam $LB_1$ is reflected toward the photo receptor belt 101 through the f-θ lens under control of a CPU (not shown). As the polygon mirror $PM_1$ turns, the photoconductive surface of the photo receptor belt 101 is scanned with the laser beam $LB_1$ modulated according to print data while the photo receptor belt 101 moves in the direction 102, thereby forming a latent image thereon. The laser beam $LB_1$ traverses the extending portion of the beam detector $BD_1$ and the photoconductive surface of the photo receptor belt 101 in the primary scanning direction indicated by directed lines $201_1$ . . . $204_1$. Similarly, the other laser units $LU_2$ to $LU_4$ perform the scanning operation of the laser beams $LB_2$ to $LB_4$ under the control of the CPU.

Figure 2:
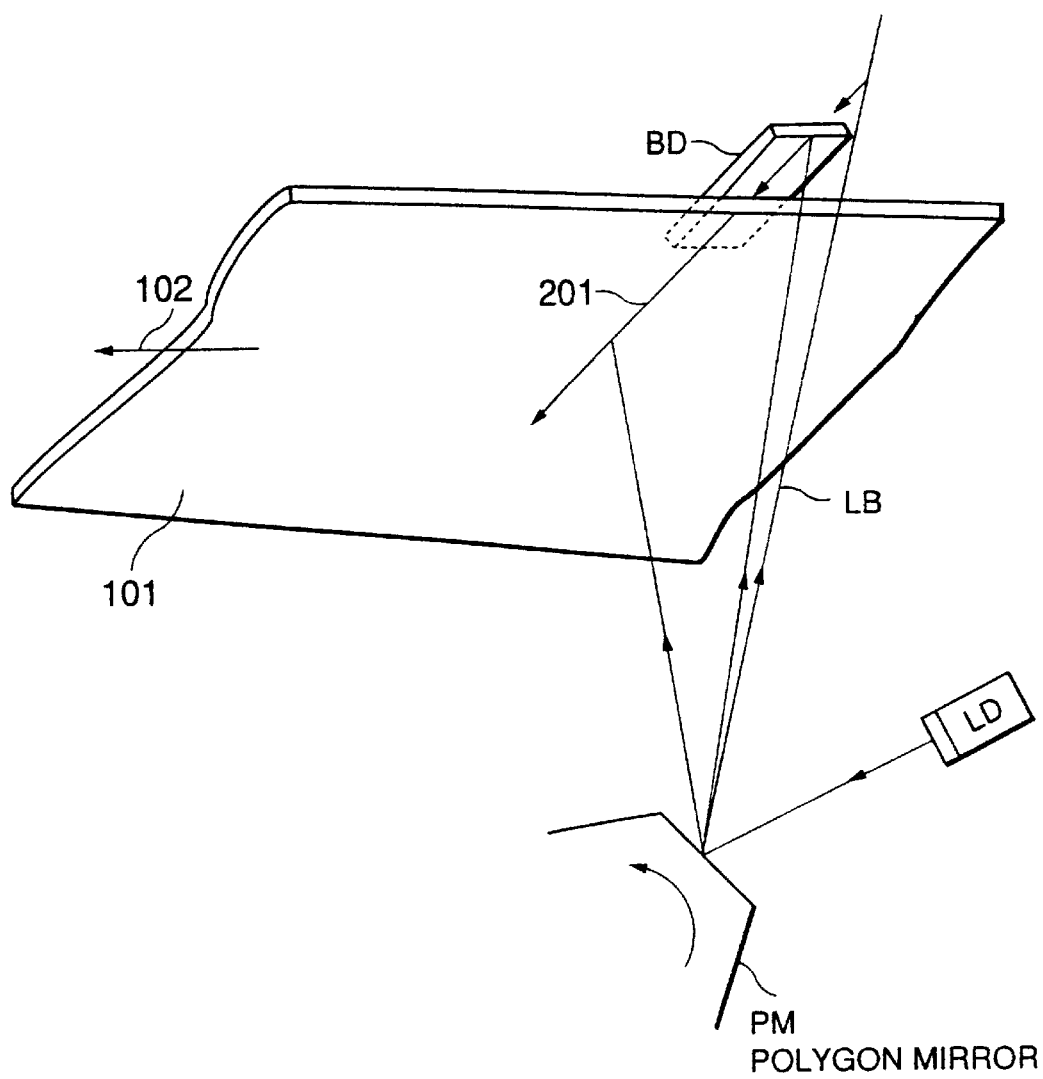
FIG. 2 is a diagram showing an example of a beam detector section in the color image forming apparatus.

Referring to FIG. 2, a beam detector BD which is any of the beam detectors $BD_1$–$BD_4$ may be shaped like a narrow piece. The beam detector BD is placed parallel to the scanning direction 201 behind the photo receptor belt 101 such that the beam detector BD is partially obstructed by the photo receptor belt 101. The beam detector BD is a photo sensor for detecting a position of the edge of the photo receptor belt 101 in the scanning direction 201. The beam detector BD may be a photo diode which can detect the light spot of the laser beam LB while irradiated therewith. Therefore, in the case of the laser beam LB scanning at a regular speed, the time at which the scanning laser spot reaches the edge of the beam detector BD and the time at which the scanning laser spot reaches the edge of the photo receptor belt 101 are detected by monitoring a change of the output signal of the beam detector BD.

Figure 3:
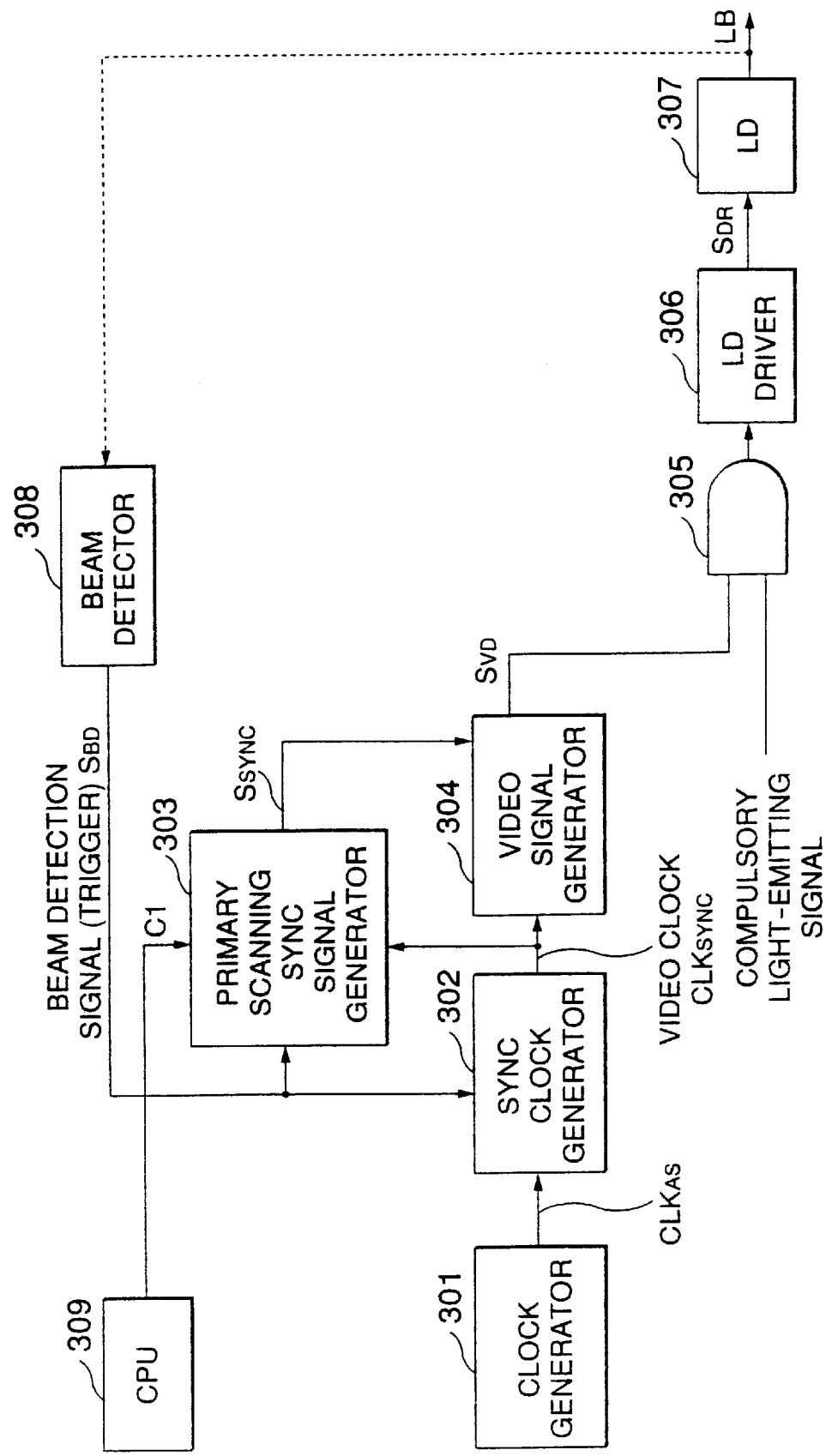
FIG. 3 is a block diagram showing a part of an internal circuit of the color image forming apparatus.

Referring to FIG. 3, a clock generator 301 is composed of a oscillator and generates a clock signal $CLK_{AS}$ of a predetermined frequency. As will be understood, because the oscillator is free running, the clock signal $CLK_{AS}$ is not always synchronized to the laser beam scanning, and cannot be used directly to control the modulation of the laser beam. To provide a suitably synchronized signal the sync clock generator 302 receives the clock signal $CLK_{AS}$ from the clock generator 301 and generates a video clock signal $CLK_{SYNC}$ which is synchronized to a beam detection signal or trigger signal $S_{BD}$ as will be described in detail later. The video clock signal $CLK_{SYNC}$ is provided to a primary scanning sync signal generator 303 and a video signal generator 304.

The primary scanning sync signal generator 303 is provided with a counter (not shown) which has been set at a preset count value C1 by a CPU 309. The counter starts counting clock pulses of the video clock signal $CLK_{SYNC}$ at the time when the edge of the photo receptor belt 101 is detected as indicated by beam detection signal $S_{BD}$. When the counter reaches the preset count value C1, the primary scanning sync signal generator 303 provides a primary-scanning (PS) sync signal $S_{SYNC}$ to the video signal generator 304.

The video signal generator 304 generates a video signal $S_{VD}$ based on the video clock signal $CLK_{SYNC}$, the PS sync signal $S_{SYNC}$, and image data. As described in more detail later, the video signal $S_{VD}$ is kept high unless a video signal for forming a latent image is being generated. The video signal $S_{VD}$ is connected as one input to an AND gate 305. The other input for AND gate 305 is provided by a compulsory light-emitting signal. The output of AND gate 305 is provided as a gating signal to a laser driver 306. This, in turn, provides a driving signal $S_{DR}$ to the laser diode 307. When the compulsory light-emitting signal goes high, the laser diode 307 emits the laser beam LB so as to illuminate the beam detector 308 with the scanning laser spot for write timing determination as will be described later. The laser diode 307 emits the laser beam LB depending on the driving signal $S_{DR}$. As will be understood by those skilled in the art, when $S_{VD}$ is high, i.e., no modulation is taking place, the light output from laser diode 307 is constant. As $S_{VD}$ switches between its high and low levels during modulation, the laser beam is switched on and off accordingly.

Figures 4A, 4B:
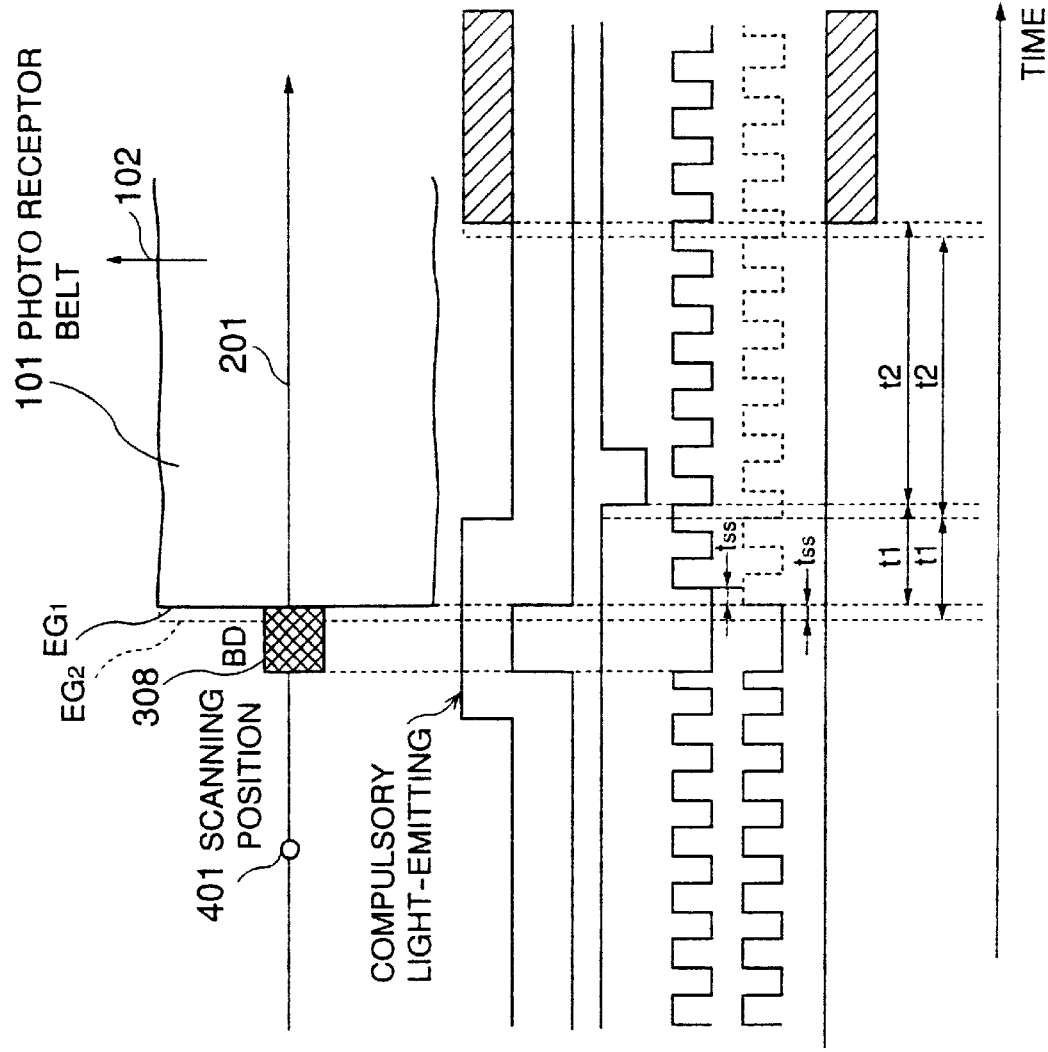
FIG. 4A is a plan view of the beam detector and the photo receptor belt.
FIG. 4B is a time chart for explaining an operation of the color image forming apparatus.

As shown in FIG. 4A, 401 represents the instantaneous position of the laser beam as it moves in the primary scanning direction 201. When the laser beam approaches the beam detector BD, the compulsory light-emitting signal goes high, and laser diode 307 illuminates beam detector 308 as the beam moves along scan line 201.

Referring to FIG. 4B, when the compulsory light-emitting signal is high, as shown in line a), the driving signal $S_{DR}$ also goes high, and the laser diode 307 is activated. Therefore, the trigger (beam detection) signal $S_{BD}$ goes high when the scanning laser spot 401 reaches the edge of the beam detector 308 and then goes low when the scanning laser spot 401 reaches the edge $EG_1$ of the photo receptor belt 101 as shown in b) of FIG. 4B.

When the trigger signal $S_{BD}$ goes low at the position of the edge $EG_1$ of the photo receptor belt 101, the sync clock generator 302 starts generating the video clock signal $CLK_{SYNC}$ after a lapse of predetermined delay time $t_{SS}$ as shown in d-1) of FIG. 4B. More specifically, when detecting the trailing edge of the trigger signal $S_{BD}$, the sync clock generator 302 generates the video clock signal $CLK_{SYNC}$ starting with the leading clock pulse after a lapse of the predetermined delay time $t_{SS}$. The predetermined delay time $t_{SS}$ is a fixed time period from the trailing edge of the trigger signal $S_{BD}$ to the leading edge of the leading clock pulse of the video clock signal $CLK_{SYNC}$. It is possible that $t_{SS}$ is substantially zero. Since $t_{SS}$ is a fixed time period, the video clock signal $CLK_{SYNC}$ is generated in synchronization with the trailing edge of the trigger signal $S_{BD}$, that is, the edge of $EG_1$ of the photo receptor belt 101.

For instance, consider the case where the photo receptor belt 101 is slightly shifted to the position indicated by $EG_2$ as shown in FIG. 4A. In this case, the trigger signal $S_{BD}$ goes low at the edge position $EG_2$ earlier than in the case of the edge position $EG_1$. Therefore, the sync clock generator 302 starts generating the video clock signal $CLK_{SYNC}$ after a lapse of predetermined delay time $t_{SS}$ as shown in d-2) of FIG. 4B. In other words, the video clock signal $CLK_{SYNC}$ in the case of the edge position $EG_2$ is started earlier than in the case of the edge position $EG_1$ by a time period corresponding to a shift of the photo receptor belt 101 from the edge position $EG_1$ to $EG_2$.

Therefore, the start time of the video clock signal $CLK_{SYNC}$ with respect to the edge of the photo receptor belt 101 is kept constant independently of displacements of the photo receptor belt 101.

The primary scanning sync signal generator 303 starts counting the number of pulses of the video clock signal $CLK_{SYNC}$ when the trigger signal $S_{BD}$ goes low at the edge position $EG_1$ of the photo receptor belt 101. When the counter reaches the preset count value C1 corresponding to a preset time period t1 (here, as an example, C1–2), the primary scanning sync signal generator 303 outputs a PS sync signal $S_{SYNC}$ to the video signal generator 304 as shown in c) of FIG. 4B. The video signal generator 304 generates the stored image data as a video signal $S_{VD}$ in synchronization with the video clock signal $CLK_{SYNC}$ from when the PS sync signal $S_{SYNC}$ goes low. Again, by way of example, the latent image to be recorded on photo receptor belt 101 is blank until a time t2. Accordingly, the laser diode 307 starts emitting a modulated laser beam only after a lapse of a time period t2. In this way, a latent image for each color is formed on the photo receptor belt 101 with the laser diode 307 switching on and off depending on the video signal $S_{VD}$.

Since the start timing of the video clock signal $CLK_{SYNC}$ with respect to the edge of the photo receptor belt 101 is kept constant as described before, the write start position of the video signal $S_{VD}$ is at a constant distance from the edge of the photo receptor belt 101 independently of displacements of the photo receptor belt 101.

Therefore, in the case of color image forming, color deviation of the image formed on the photo receptor belt 101 can be eliminated, resulting in high-quality color image.

Further, since the video clock signal $CLK_{SYNC}$ is synchronized to the edge of the photo receptor belt 101, it is not necessary to use the reference signals of the laser units $LU_1$–$LU_4$ to determine the write start positions, respectively. The respective reference signals of the laser units would vary, resulting in variations in the write start positions. Therefore, by using the sync clock signal synchronized to the edge of the photo receptor belt, the precise write start position of the video signal $S_{VD}$ can be achieved.

It should be noted that the shapes and dimensions of the components as described above are just one example. Although only one embodiment of the present invention has been described herein, it should be apparent to those skilled in the art that the present invention may be embodied in many other specific forms without departing from the spirit or scope of the invention. Therefore, the present embodiment is to be considered as illustrative and not restrictive and the invention is not to be limited to the details given herein, but may be modified within the scope of the appended claims.

What is claimed is:

1. A method for forming a latent image on a photo receptor belt by repeatedly scanning the photo receptor belt in a first direction along a scan path with a laser beam modulated in accordance with image data, the photo receptor belt moving continuously in a direction substantially transverse to the scan path, but also being subject to unwanted movement along the scan path, the method comprising the steps of:

generating a first clock signal;

compensating for unwanted belt movement along the scan path without repositioning the belt, the compensation step being comprised of:

generating an edge detection signal during each laser beam scan when the laser beam encounters one edge of the photo receptor belt;

synchronizing the first clock signal to the edge detection signal to produce a synchronized clock signal; and identifying the passage of A predetermined delay interval following the production of the edge detection signal; and permitting modulation of the laser beam in accordance with the image data to begin only after passage of the predetermined time interval, thereby assuring that each scan cycle begins with the laser beam at the same position along the scan path.

2. The method as described in claim 1, in which the edge of the photo receptor belt detected to produce the edge detection signal is the edge encountered by the laser beam at the beginning of the scan.

3. The method as described in claim 1, in which the clock signal is synchronized with the edge detection signal during each scan cycle.

4. The method as described in claim 1, in which the synchronized clock signal is in a predetermined phase relationship to the edge detection signal.

5. The method as described in claim 4, in which the leading clock pulse of the synchronized clock signal is generated at a predetermined time following production of the edge detection signal.

6. The method as described in claim 5, in which the edge of the photo receptor belt detected to produce the edge detection signal is the edge encountered by the laser beam at the beginning of the scan.

7. The method as described in claim 1, in which a latent image for each of a plurality of colors is formed by a different laser beam, and in which the image data is a video signal.

8. The method as described in claim 1, wherein the latent image is comprised of a plurality of color separation images; wherein the method is further comprised of:

forming each of the color separation images by repeatedly scanning the photo receptor belt with separate laser beams modulated in accordance with image data for each of the color separation images; wherein the step of compensating for unwanted belt movement is further comprised of:

generating an edge detection signal during each laser beam scan when the laser beam for each of the color separation images encounters the edge of the photo receptor belt;

synchronizing the first clock signal to each of the edge detection signals to produce a synchronized clock signal for each color separation image; and identifying the passage of predetermined delay intervals following the production of each of the edge detection signals, each delay interval corresponding respectively to one of the color separation images; and permitting modulation of the laser beam for each color separation image in accordance with its image data to begin only after passage of the associated predetermined time interval.

9. An apparatus for forming a latent image on a photo receptor belt by scanning the photo receptor belt in a first direction along a scan path with a laser beam modulated in accordance with image data, the photo receptor belt moving continuously in a second direction transverse to the scan path, but also being subject to unwanted movement along the scan path, the apparatus comprising:

an emitter which produces the laser beam;

a driver connected to the emitter;

a scanner which directs the laser beam across the surface of the photo receptor belt in the first direction;

a first clock signal generator;

a compensation circuit which compensates for unwanted belt movement in the scanning direction without repositioning the belt the compensation circuit being comprised of:

an edge detector which produces an edge detection signal during each laser beam scan as the beam encounters one edge of the photo receptor belt;

a second clock signal generator connected to the first clock signal generator and to the edge detector which synchronizes the output of the first clock signal generator with the edge detection signal;

a scanning synchronization signal generator connected to the second clock signal generator and to the edge detector which generates a scanning synchronization signal at a predetermined time after the edge detection signal; and an image signal generator which responds to the synchronized clock signal and the scanning synchronization signal to provide an image signal to the emitter driver for modulating the laser beam, whereby each modulated scan begins at the same location along the scan path.

10. An apparatus as described in claim 9, in which the edge detector comprises a photo detector positioned at the edge of the photo receptor belt which is encountered by the laser beam at the beginning of each scan cycle.

11. An apparatus as described in claim 10, in which the photodetector is located on the side of the photo receptor belt opposite to that on which the latent image is to be produced, and so positioned that a first portion thereof is shielded from the scanning laser beam by the belt, while a second portion extends beyond the edge of the belt along the laser beam scan path so that the second portion of the photodetector is illuminated by the laser beam before the edge of the belt during each scan cycle.

12. An apparatus as described in claim 9, in which the synchronized clock signal is in the form of a series of pulses, and in which the leading pulse of the synchronized clock signal is generated at a predetermined time following production of the edge detection signal.

* * * * *